US008221640B2

(12) United States Patent
Magnaldo

(10) Patent No.: US 8,221,640 B2
(45) Date of Patent: Jul. 17, 2012

(54) METHOD OF DISSOLVING THE SOLIDS FORMED IN A NUCLEAR PLANT

(75) Inventor: Alastair Magnaldo, Connaux (FR)

(73) Assignees: Commissariat a l'Energie Atomique, Paris (FR); Compagnie General des Matieres Nuclealres, Velizy-Villacoublay (FR)

( * ) Notice: Subject to any disclaimer, the term of this patent is extended or adjusted under 35 U.S.C. 154(b) by 673 days.

(21) Appl. No.: 11/800,890

(22) Filed: May 8, 2007

(65) Prior Publication Data

US 2008/0006606 A1 Jan. 10, 2008

Related U.S. Application Data

(63) Continuation of application No. 10/433,168, filed as application No. PCT/FR01/03821 on Dec. 4, 2001.

(51) Int. Cl.
*C03C 15/00* (2006.01)

(52) U.S. Cl. .............. 216/83; 216/96; 423/10; 423/140; 423/153; 588/18; 134/1.3; 134/3; 134/13

(58) Field of Classification Search .................... 216/83, 216/96; 423/10, 140, 150; 588/18; 134/1.3, 134/3, 13, 22.1, 22.11–22.14, 41
See application file for complete search history.

(56) References Cited

U.S. PATENT DOCUMENTS

| | | | | |
|---|---|---|---|---|
| 3,080,262 | A | 3/1963 | Newman | |
| 3,115,450 | A | 12/1963 | Schanz | |
| 3,243,257 | A | 3/1966 | Coleman | |
| 4,302,429 | A | 11/1981 | Lawes et al. | |
| 4,311,341 | A | 1/1982 | DeVries et al. | |
| 4,333,912 | A * | 6/1982 | Mills et al. | 423/20 |
| 4,481,040 | A | 11/1984 | Brookes et al. | |
| 4,880,559 | A * | 11/1989 | Murray et al. | 510/110 |
| 5,071,582 | A | 12/1991 | Conville et al. | |
| 5,322,644 | A | 6/1994 | Dunn et al. | |

FOREIGN PATENT DOCUMENTS

| | | |
|---|---|---|
| BE | 1 002 593 | 4/1991 |
| EP | 0 071 336 | 2/1983 |
| FR | 2 601 379 | 1/1988 |
| FR | 2 746 207 | 9/1997 |
| JP | 3211498 A | 9/1991 |

OTHER PUBLICATIONS

Sedov et al. Atomnaya Energiya, vol. 65, No. 6, Dec 91988), pp. 399-403 (English Translation, pp. 972-976.*
Paul Goris et al. Analytical Chemistry, vol. 29, No. 11, (1957), pp. 1590-1592.*
Bosholm, J., "Entfernung eisenoxidhaltiger Belage aus Dampferzeugern von Druckwasserrcaktoren", Kornteehnik, [Carl Hauser Verlag] 58(1): 37-39, 1993.
Dervin, J., et al., "Eturde en solution et a I etat Solide des Carbonates Complexes dc Zirconium et d'Hafnium", Revue do Chimio Minerale, [Study of Zirconium and Hafnium Complex Carbonates in Solution and in the solid State] 11(3): 372-388, 1974.
Fauvet P. and Legry, G. P., Corrosion Aspects in Reprocessing Technology, [12th Scandinavian Corrosion Congress & Eurocorr '92] 305-314, 1992.
Gmelin, Transurane D1, 1975, p. 134.
Naguire, M. A. and Yau, T. L., "Corrosion-electrochemical properties of zirconium in mineral acids", NACE, 1986.
Nitsche, H. and Silva, R.J., Investigation of the Carbonate Complexation of Pu(IV) in Aqueous Solution, Radiochimica Acta, [R. Oldenbourg Berlag. Munchen] 72: 65-72, 1996.
Rizkalla, E.N. and Choppin, G. R., "Solubilities and Stabilities of Zirconium Species in Aqueous Solutions: Literature Review", Technical Report of Battelle Memorial Inst, Columbus OH (USA). Office of Nuclear Waste Isolation; Florida State Univ. Tallahassee (USA). Dept of Chemistry (BMI/UNWI/C-37) OSTI Identifier ID: 6970098; TI88013295, 1988, USA; 35 pages.
Schmuck J., "Comportement á in corrosion du zirconium dans la chimie", Journés d'Etudes stir le Zirconium, date unknown, p. 51-70.
Wick, O. J., "Solution Chemistry of Plutonium", Plutonium Handbook: A Guide to the Technology, Ch. 13, 1967, p. 450-451.
Yamaguchi, I., et al., "Effect of Complexation on Solubility of Pu(IV) in Aqueous Carbonate System", Radiochimica Acta, [R. Oldenbourg Verlag. Munchen] 66-67: 9-14, 1994.
Office Action dated May 28, 2009, from corresponding U.S. Appl. No. 10/433,168.
Office Action dated Dec. 9, 2009, from corresponding U.S. Appl. No. 10/433,168.
Doucet, Frederic J. , et al., "The formation of hydrated zirconium molybdate in simulated spent nuclear fuel processing solutions", Phys. Chem. Chem. Phys, 2002, p. 3491-3499, vol. 4.
Rao, B.S.M., et al., "Characterization of the solids formed from cimulated nuclear fuel reprocessing solutions", Journal of Nuclear Materials, 1990, p. 39-49, vol. 170, No. 1.

* cited by examiner

*Primary Examiner* — Lan Vinh
*Assistant Examiner* — Maki Angadi
(74) *Attorney, Agent, or Firm* — Brinks Hofer Gilson & Lione

(57) ABSTRACT

The method of dissolving the solids formed in the apparatus and pipework of a nuclear plant, in which the solids are brought into contact with an aqueous dissolving solution chosen from aqueous solutions of carbonate ions having a concentration of greater than or equal to 0.3M, aqueous solutions of bicarbonate ions, and solutions of a mixture of nitric acid and of a polycarboxylic acid chosen from oxalic acid and triacids.

6 Claims, No Drawings

METHOD OF DISSOLVING THE SOLIDS FORMED IN A NUCLEAR PLANT

CROSS-REFERENCE TO RELATED APPLICATIONS

This application is a continuation of U.S. application Ser. No. 10/433,168, which is a National Stage application of PCT/FR2001/03821, filed Dec. 4, 2001, which claims benefit of French Patent Application No. 00/15674 filed Dec. 4, 2000, the entire contents of which applications are incorporated herein by reference.

DETAILED DESCRIPTION OF THE INVENTION

The present invention relates to a method of dissolving the solids formed in a nuclear plant.

These are in particular the solids that have formed on the walls of apparatus and pipework or that have built up at the bottom of the apparatus of a nuclear fuel processing plant, or of tanks for storing the liquid effluents obtained in particular from reprocessing.

These solids form on the walls of the apparatus, tanks, containers, pipes and pipework, in the form of layers of scale, or accumulate at the bottom of the apparatus, tanks and other containers in the form of solid deposits.

These solids essentially consist of the following crystalline forms:

- zirconium molybdate and mixed zirconium plutonium molybdate;
- zirconium phosphate;
- cesium phosphomolybdate;
- plutonium phosphate;
- molybdenum, zirconium and plutonium oxides;
- iron phosphate; and
- barium sulphate.

These solids are causing the accumulation of plutonium and of radiocontaminants, such as Am, Cs, Sb and Cm in the form of insoluble precipitates and are responsible for the encrusting of apparatus and the clogging of submerged pipes.

An example of the main elements, excluding oxygen, that may be found in a precipitate is given in Table I.

TABLE I

| Element | wt % |
|---|---|
| Mo | 10 |
| Zr | 17 |
| P | 10 |

These elements are not labile: to decontaminate these deposits requires complete dissolution of the solids.

These elements cannot be taken up by aqueous acid solutions of the solution from which the precipitates derive (for example in the case of nitric acid solutions) since their solubility is low.

For example, the solubility of a zirconium molybdate compound is less than 0.2 g/l in 4N nitric acid.

The only strong acids in which these solids are soluble, such as halogenated acids and acids based on sulphur and phosphorus, entail excessively high risks with respect to corrosion [1 to 3] or are unsuitable for the extraction methods.

One of the methods of the prior art dissolves some of these solids by two successive operations: namely an etching operation in a basic medium using sodium hydroxide followed by the solids being taken up by nitric acid. Etching with sodium hydroxide makes it possible to dissolve ions having a strong oxolation, such as molybdenum, but precipitates the other ions, the most troublesome of which are zirconium and plutonium, with the formation of hydroxides having a macromolecular structure [4]. Consequently, penetration by the basic etchant into the layers of scale is very limited by the reprecipitation of these compounds.

The use of sodium hydroxide is also disadvantageous for the operator since the possible presence of plutonium in the deposits requires the safety/criticality of the rinsing process to be permanently guaranteed, by ensuring that there is no accumulation of plutonium in hydroxylated form, and it is necessary for the alkaline solutions to be rapidly reacidified so as to prevent the irreversible formation of hydrated plutonium oxide [4].

Thus, the effectiveness of the basic rinsing operations is intentionally limited, constraining the operator to carry out, for a comparable result, several sodium hydroxide etching/nitric acid uptake cycles.

This constraint therefore results in a longer operating time and a substantial volume of effluents to be recycled.

Another method uses hydrogen peroxide in nitric medium. Etching the non-contaminated solids allows precipitates of less than 10 g/l to be dissolved. However, the structure of the solids, in deposit or accumulation form, results in a slow etching rate compared with the rate of decomposition of hydrogen peroxide in an irradiating medium. Hydrogen peroxide in nitric medium cannot be used to dissolve more than 4 g/l of precipitate with its radiocontaminants, whatever the etching temperature.

There is therefore a need for a method of dissolution, and especially for a dissolving medium or reactant which does not have the abovementioned drawbacks of the methods of the prior art that are essentially associated with the dissolving media or reactants that they employ.

Such a method of dissolution has to use, instead of the reactants used hitherto, a reactive dissolving medium which solves the abovementioned problems and which satisfies certain of the following criteria:

- elimination of the sodium counterion, sodium being an element not easily compatible with the current management of effluents by vitrification;
- increase in the rates of disintegration of the solid, particularly at room temperature, so as to be able to rinse the apparatus in the open air and thus have an operating time reduced to the minimum;
- decrease in the number of rinsing operations and reduction in the volume of effluents to be reprocessed; and
- maintenance, in non-colloidal or hydroxylated ionic form, of the plutonium of the rinsing solutions.

It is an object of the invention to provide a method of dissolving the solids formed in apparatus and pipework of a nuclear plant which meets inter alia the requirements indicated below and which satisfies certain of the abovementioned criteria and requirements, in particular as regards the dissolving medium.

It is an object of the invention also to provide an operating method of dissolving the solids formed in apparatus and pipework of a nuclear plant which does not have the drawbacks, defects, limitations and disadvantages of the methods of the prior art and which solves the problems of the methods of the prior art.

This object and other ones are achieved, in accordance with the invention, by a method of dissolving the solids formed in the apparatus and pipework of a nuclear plant, in which said solids are brought into contact with an aqueous dissolving solution chosen from aqueous solutions of carbonate ions having a concentration of greater than or equal to 0.3M, aqueous solutions of bicarbonate ions, and aqueous solutions of a mixture of nitric acid and of a polycarboxylic acid chosen from oxalic acid and triacids.

The method of the invention employs aqueous solutions that have never been mentioned or suggested in the prior art for being used to dissolve the solids formed in apparatus and pipework of a nuclear plant.

The method of the invention meets all the requirements indicated above; in particular, the dissolving medium chosen from the aqueous solutions listed above satisfies all the criteria and all the requirements for such a dissolving medium.

Furthermore, in general the contacting operation is advantageously carried out at a moderate temperature, namely for example from 20 to 60 or 80° C., preferably at room temperature, for example 20-25° C.

The contacting operation is relatively short, even for achieving complete dissolution of the solids. For example, this operation lasts from 1 to 24 hours depending on the physical form and the quantity of the compounds to be dissolved.

More specifically, the method of the invention also relates to a method of dissolving the solids formed in the apparatus and pipework of a nuclear plant.

The term "solids formed" is understood to mean the solids that have formed not as the result of a normal process carried out in such plants, that is to say undesirable and parasitic solids that form in the plants because in particular of side (undesirable) reactions that take place therein or of the fluids that flow therein.

The term "nuclear plant" is understood to mean any plant that uses, processes or manufactures radioelements in whatever form.

For example, it may be a nuclear power station for generating energy, a nuclear fuel production plant or, preferably, a nuclear fuel reprocessing plant.

The term "apparatus" is understood to mean any type of apparatus that the abovementioned plants may use: for example, it may be separating apparatus, or apparatus for the dissolution, desorption, concentration, denitration, clarification and transfer of solutions, bubbling tubes, measurement tubes or nozzles.

The term "apparatus" also means the tanks, reservoirs, ponds, enclosures for the storage of reactants or of liquid effluents, for example liquid effluents derived from reprocessing.

The term "pipework" is understood to mean all the fluid transfer pipes and pipework that may be encountered in the plants described above.

The solids that it is desired to remove, or dissolve, in the method of the invention are normally insoluble precipitates that are generally formed on the walls of the apparatus and pipework in the form of layers of scale or have accumulated at the bottom of the apparatus in the form of solid deposits.

According to the invention, the contacting with the dissolving solution may be carried out in various ways, both continuously and batchwise. For example, a solution may be made to flow continuously over the deposits and/or the layers to be removed, by rinsing the walls of the apparatus and pipework with the solution. In the case of deposits located at the bottom of the apparatus, this may be filled with the solution and left to act for the time needed to dissolve the solids.

As already mentioned at the start of the present description, the nature of the solids can vary and the crystalline compounds or forms that may be involved in the composition of these solids are chosen, for example, from:

- zirconium molybdate and mixed zirconium plutonium molybdate;
- zirconium phosphates and associated gels;
- cesium phosphomolybdate;
- plutonium phosphate;
- molybdenum, zirconium and plutonium oxides;
- iron phosphate; and
- barium sulphate.

The method according to the invention is just as effective whatever the main constituent of the solids.

The aqueous solution employed in the method of the invention may be chosen from solutions of carbonate ions having a concentration of greater than or equal to 0.3M. Carbonate ions at these concentrations act by predominantly forming soluble charged zirconium tetracarbonate and plutonium tetracarbonate ions according, for example, to the reaction below in the case of zirconium molybdate:

$$ZrMo_2O_7(OH)_2,\ 2H_2O + 4CO_3^{2-} \rightleftharpoons Zr(CO_3)_4^{4-} + 2MoO_4^{2} + 3H_2O$$

Previous studies on the use of the above ion for this purpose have resulted in failure, since the carbonate ion concentrations used were in all cases less than 0.3M, favouring the insoluble forms of zirconium and plutonium dicarbonates [5 to 8].

Thus, in the prior studies, the formation of zirconium and plutonium hydroxides was accompanied by the dissolution, for example, of mixed zirconium plutonium molybdates. It was absolutely unforeseeable that the use, according to the invention, of a carbonate ion concentration of greater than or equal to 0.3M could result in the formation of soluble zirconium compounds and therefore in the solids being completely dissolved.

The carbonate ion concentration in the aqueous solution will preferably be from 0.4M up to the solubility limit in water of the carbonate salt (from which the ion is derived). This limit varies depending on the carbonate used and on the temperature—it is generally from 2M at 20° C. to 3.4M at 30° C. for example in the case of sodium carbonate—as an example, it is about 3M at 25° C. in the case of sodium carbonate.

The solubility of the solid elements to be dissolved varies linearly with the initial carbonate ion concentration up to the maximum carbonate ion concentration (about 3 mol/l in the case of sodium carbonate in water at 25° C.). The solubility of zirconium molybdate is 315 g/l at 25° C. for a carbonate concentration of 3 mol/l and the initial carbonate/dissolved Zr molar ratio is in general 4 to 5, for example.

The volume of dissolving solution used to dissolve the solids varies depending on the concentration of the solution used, but it is generally from 3 ml to 100 ml per gram of solids, for example for a 1M carbonate solution it is from 10 to 30 ml per gram.

According to another advantage of the method of the invention, the plutonium derived from the dissolved solids is stable over periods exceeding one week in the carbonate ion dissolving solution in the presence of other dissolved elements. Its concentration is, for example, about 8 g/l in 1M carbonate medium. As in the case of zirconium, the charged carbonate complexes are responsible for this stability.

The salt, from which the carbonate ions derive, is generally chosen to have, as counterions, ions of alkali metals, such as sodium and potassium, ions of alkaline-earth metals, and ammonium ions.

Sodium carbonate is preferred but the use of other salts, such as potassium carbonate or ammonium carbonate, may give identical results, while limiting the possibility of hot (60° C.) coprecipitation of zirconium. Furthermore, the solubility of the radiocontaminants other than plutonium may be increased by a suitable choice of counterion. Thus, for example, the potassium ion can be used to dissolve the basic forms of antimony.

There are many advantages of carbonate ions as dissolution reactant. This is because, at room temperature and with mixed zirconium plutonium molybdate saturation, it does not form solids with these elements, and therefore there is no limit as regards the quantity of carbonate ions in the apparatus.

The effectiveness of etching by carbonate ions at room temperature on thick layers is much better than with dilute sodium hydroxide. It is unnecessary for the carbonate rinse to be followed by an acid rinse in order to dissolve as much material as possible. Advantageously, after the contacting step, an acid solution, preferably a nitric acid solution, is added to the aqueous dissolving solution containing the carbonate ions.

After such acidification of the dissolving solution, for example by nitric acid, the carbonate ions are completely destroyed.

To give a comparison, the method comprising dissolution using 1M sodium hydroxide followed by acid uptake makes it possible to dissolve only 20 g/l of precipitate at most.

The aqueous dissolving solution can also be chosen from aqueous solutions of bicarbonate or hydrogen carbonate ions and the concentration of these solutions is generally from 0 to 2M in terms of bicarbonate ions.

Finally, the aqueous dissolving solution may be chosen from aqueous solutions comprising a mixture of nitric acid and of a polycarboxylic acid chosen from oxalic acid and triacids.

The concentration of nitric acid in this solution is generally from 0.05 to 1M and the concentration of polycarboxylic acid in this solution is generally from 0.3 to 1M.

The polycarboxylic acid that is used is therefore, according to the invention, generally chosen from oxalic acid and triacids such as citric acid. Oxalic acid is preferred.

A mixture of oxalic and nitric acids acts by forming, when the oxalate concentration is high enough (greater than 0.5M), soluble charged oxalate complexes of zirconium and of plutonium [9].

Dissolution of the solids by a mixture of oxalic and nitric acids is at least as effective as by sodium hydroxide and, under certain conditions, does not lead to the formation of solid zirconium and plutonium species, for example when the oxalate ion concentration is high enough (greater than or equal to about 0.5M).

The solubility of zirconium molybdate in this medium may be attributed, by analogy with plutonium, to the formation of charged zirconium oxalate complexes $Zr(C_2O_4)_3^{2-}$ or $Zr(C_2O_4)_4^{4-}$ that prevent it from condensing.

The oxalate ion concentration must preferably be high enough (greater than or equal to about 0.5M) and the nitric acid concentration low enough (less than or equal to 1M) to limit the formation of neutral complexes liable to precipitate.

It is limited by the solubility of oxalic acid, which is about 0.8M in 1M nitric acid.

As in the case of the carbonates, it is not necessary for this rinse to be followed by a nitric rinse.

The dissolving operation is carried out at a temperature of 20 to 80° C., for example 60° C., and the solution resulting from the dissolution is stable at 25° C.

The additional major advantage of this reactant is the absence of counterions.

If in the method of the invention an aqueous solution is used that consists of a mixture of nitric acid and of a polycarboxylic acid chosen according to the invention, the contacting step may advantageously be followed by a step in which the acids of the dissolving solution are destroyed by oxidation, for example under the following conditions: nitric acidity of 3N in the presence of 0.01M $Mn^{2+}$ at 100° C.

The invention will now be described with reference to the following examples, given by way of indication but implying no limitation.

EXAMPLES

The following examples show the effectiveness of the dissolving solutions used in the method of the invention by carrying out experiments to measure the solubility in the case of zirconium molybdate.

Example 1

Initial zirconium molybdate crystals were produced by gentle precipitation at 80° C. from a 5 g/l molybdenum$^{(VI)}$ and 2.5 g/l zirconium$^{(IV)}$ solution in 3N nitric acid. The filtered precipitate was washed in 1N nitric acid, dried at 40° C. and then kept for several days in a desiccator. The crystals were characterized by XDF and thermogravimetric analysis. No compound other than zirconium molybdate of chemical formula $ZrMo_2O_7(OH)_2.2H_2O$ was detected.

One gram of zirconium molybdate crystals was placed in a flask stirred by a bar magnet.

A 1M sodium carbonate solution obtained by dissolving sodium carbonate salts was added at a temperature of 20° C. with a flow rate of 1 ml/hour by a metering pump. By means of an optode placed in the flask, a spectrophotometer measured the turbidity of the solution formed from the mixture of zirconium molybdate crystals and the sodium carbonate solution at 20° C. The volume of solution added to achieve a zero turbidity was recorded, i.e. 10.4±0.1 ml under the experimental conditions given above. The initial mass divided by the added volume was 96±1 g/l: this is the upper bound of the solubility in grams per liter. A lower bound was obtained by analysing an identical solution saturated with solids. For this purpose, 1.5 grams of zirconium molybdate crystals were placed in a flask containing 10 ml of 1M sodium carbonate at a temperature of 20° C. This was all stirred by a bar magnet. After 10 hours, the solution was filtered using a 0.3 μm porosity filter. The filtrate was dried for six days at 40° C. until the mass stabilized (the mass varied by less than 2% over one day's drying). The difference in mass before and after contact divided by the volume of the solution, therefore 94±2 g/l in this example, was the lower bound of the solubility. The solubility of zirconium molybdate in 1M sodium bicarbonate at 20° C. is therefore estimated to be between 92 and 97 g/l.

Example 2

The same experiment was carried out, but this time with a nitric/oxalic acid mixture at 60° C.

Mixtures of nitric and oxalic acids having respective molarities of between 0.3M and 1M and of 0.8M were obtained by dissolving oxalic acid crystals in nitric acid. The same experimental approach described above in the case of carbonate ions was applied. The solubility of zirconium molybdate at 60° C. was between 30 and 40 g/l, whatever the nitric acid.

REFERENCES

[1] P. FAUVET and G. P. LEGRY "Corrosion aspects in reprocessing technology", CEA/CONF/11294.

[2] J. SCHMUCK, "Comportement à la corrosion du zirconium dans la chimie" [*Zirconium corrosion behaviour in chemistry]*.

[3] M.A. NAGUIRE and T.L. YAU, "Corrosion-electrochemical properties of zirconium in mineral acids", NACE 1986.

[4] Gmelin, Transurance D1, page 134.

[5] J. Dervin and J. Fauchere, "Etude en solution et à l'état solide des carbonates complexes de zirconium et d'hafnium" [*Study of zirconium and hafnium complex carbonates in solution and in the solid state*], Revue de Chimie Minérale, vol. 11(3), pp. 372, 1974.

[6] H. Nitsche and R. J. Silva, "Investigation of the Carbonate Complexation of Pu(IV)", Radiochimica Acta, vol. 72, pp. 65-72, 1996.

[7] T. Yamaguchi and Y. Sakamoto, "Effect of the Complexation on Solubility of Pu(IV) in Aqueous Carbonate System", Radiochimica Acta, vol. 66/67, pp. 9-14, 1994.

[8] E. N. Rizkalla and G. R. Choppin, "Solubilities and Stabilities of Zirconium Species in Aqueous Solutions", BMI/ONWI/C-37, TI88 013295.

[9] O. J. Wick, "Plutonium handbook: a guide to the technology", Chap. 13, page 450, Vol. 1, Gordon et Breach.

The invention claimed is:

1. A method of dissolving the solids formed in the apparatus and pipework of a nuclear plant, in which said solids are brought into contact with an aqueous dissolving solution of a mixture of nitric acid and of a polycarboxylic acid chosen from oxalic acid and triacids, wherein the nitric acid concentration is from 0.05 to 1M and the polycarboxylic acid concentration is from 0.3M to 1M, wherein said solids are in the form of layers of scale on the walls within the inner surfaces of the apparatus and/or pipework or are in the form of solid deposits accumulated at the bottom of the apparatus, and wherein the solids are dissolved in situ while attached to the walls of the apparatus and the pipework, and wherein said solids are formed from side reactions and not as a result of a normal process.

2. The method according to claim 1, in which the contacting is carried out at a temperature of 20° C. to 80° C. for a time of 1 to 24 hours.

3. The method according to claim 1, in which the polycarboxylic acid is citric acid.

4. The method according to claim 1, in which, after the contacting step, the acids of the dissolving solution are destroyed by oxidation.

5. The method according to claim 1, in which the compound or compounds involved in the composition of the solids to be dissolved is/are chosen from:

zirconium molybdate and mixed zirconium plutonium molybdate;

zirconium phosphates and associated gels;

cesium phosphomolybdate;

plutonium phosphate;

molybdenum, zirconium and plutonium oxides;

iron phosphate; and barium sulphate.

6. The method according to claim 1, wherein the nuclear plant is a nuclear fuel reprocessing plant.

* * * * *

UNITED STATES PATENT AND TRADEMARK OFFICE

CERTIFICATE OF CORRECTION

PATENT NO. : 8,221,640 B2
APPLICATION NO. : 11/800890
DATED : July 17, 2012
INVENTOR(S) : Alastair Magnaldo et al.

It is certified that error appears in the above-identified patent and that said Letters Patent is hereby corrected as shown below:

Title Page Assignees

Nuclealres should be spelled "Nucleaires"

Signed and Sealed this
Eleventh Day of September, 2012

David J. Kappos
*Director of the United States Patent and Trademark Office*